United States Patent
Takatani (10) Patent No.: US 7,583,327 B2
(45) Date of Patent: Sep. 1, 2009

(54) LIQUID CRYSTAL DISPLAY PANEL AND LIQUID CRYSTAL DISPLAY DEVICE

(75) Inventor: Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 681 days.

(21) Appl. No.: 11/075,738

(22) Filed: Mar. 10, 2005

(65) Prior Publication Data

US 2005/0200781 A1    Sep. 15, 2005

(30) Foreign Application Priority Data

Mar. 11, 2004    (JP) ............................. 2004-068805

(51) Int. Cl.
  *G02F 1/1335* (2006.01)
  *G02F 1/13357* (2006.01)
(52) U.S. Cl. .............................. 349/15; 349/61; 349/63; 349/114; 349/122; 359/462
(58) Field of Classification Search .................... 349/15, 349/61, 62, 63, 65, 114, 122, 106, 187; 359/462, 359/464, 465; 348/54, 56
See application file for complete search history.

(56) References Cited

U.S. PATENT DOCUMENTS

| | | | |
|---|---|---|---|
| 4,404,471 A | 9/1983 | Winnek et al. | |
| 4,957,351 A | 9/1990 | Shioji | |
| 5,666,226 A | 9/1997 | Ezra et al. | |
| 5,969,850 A * | 10/1999 | Harrold et al. | ............... 359/320 |
| 6,049,424 A | 4/2000 | Hamagishi | |
| 6,204,967 B1 | 3/2001 | Morishima et al. | |
| 6,215,594 B1 | 4/2001 | Inoguchi et al. | |
| 6,285,368 B1 * | 9/2001 | Sudo | .......................... 345/419 |
| 6,297,911 B1 | 10/2001 | Nishikawa et al. | |
| 6,459,532 B1 * | 10/2002 | Montgomery et al. | ....... 359/462 |
| 7,139,042 B2 | 11/2006 | Nam et al. | |
| 7,199,845 B2 * | 4/2007 | Koyama et al. | ................ 349/15 |
| 2002/0001128 A1 * | 1/2002 | Moseley et al. | ............. 359/465 |
| 2002/0109812 A1 * | 8/2002 | Takami et al. | ................ 349/113 |
| 2003/0107805 A1 | 6/2003 | Street | |
| 2003/0137620 A1 | 7/2003 | Wang et al. | |
| 2003/0214459 A1 | 11/2003 | Nishihara et al. | |
| 2004/0008251 A1 * | 1/2004 | Mashitani et al. | ............. 348/51 |
| 2004/0196560 A1 | 10/2004 | Nagasawa et al. | |

(Continued)

FOREIGN PATENT DOCUMENTS

GB    2 278 222 A    11/1994

(Continued)

OTHER PUBLICATIONS

U.S. Office Action mailed Mar. 22, 2007 in corresponding U.S. Appl. No. 11/365,813.

(Continued)

*Primary Examiner*—Dung Nguyen
*Assistant Examiner*—Tai Duong
(74) *Attorney, Agent, or Firm*—Nixon & Vanderhye, P.C.

(57) ABSTRACT

A liquid crystal layer, a color filter, a thick resin layer, and a parallax barrier layer are provided between two transparent substrates. The separation between the color filter and the parallax barrier layer is adjusted using the thick resin layer to a short distance suitable for dual image displays.

9 Claims, 6 Drawing Sheets

U.S. PATENT DOCUMENTS

| | | | |
|---|---|---|---|
| 2005/0200781 | A1 | 9/2005 | Takatani |
| 2005/0243253 | A1* | 11/2005 | Imai et al. ................... 349/122 |
| 2006/0098281 | A1* | 5/2006 | Fukushima et al. ......... 359/464 |
| 2006/0152812 | A1 | 7/2006 | Woodgate et al. |
| 2006/0164578 | A1* | 7/2006 | Matsumoto et al. ......... 349/117 |
| 2006/0238863 | A1 | 10/2006 | Saishu |
| 2007/0058127 | A1 | 3/2007 | Mather et al. |
| 2007/0058258 | A1 | 3/2007 | Mather et al. |

FOREIGN PATENT DOCUMENTS

| | | | |
|---|---|---|---|
| GB | 2 405 542 | A | 3/2005 |
| JP | 3-119889 | A | 5/1991 |
| JP | 11-331876 | A | 11/1999 |
| JP | 2000-36927 | A | 2/2000 |

OTHER PUBLICATIONS

U.S. Final Office Action mailed Sep. 25, 2007 in corresponding U.S. Appl. No. 11/365,813.

Chinese Office Action and English translation thereof, mailed Jun. 9, 2006 in corresponding Chinese application 200410089918.4.

U.S. Office Action mailed Oct. 22, 2007 in corresponding U.S. Appl. No. 11/223,206.

Office Action mailed May 20, 2008 in co-pending U.S. Appl. No. 11/223,206.

* cited by examiner

------> RIGHT EYE IMAGE
-·-·-> LEFT EYE IMAGE

DISPLAY SCREEN

FIG. 9(b)

------> FIRST IMAGE
-·-·-> SECOND IMAGE

DISPLAY SCREEN

Fig. 10

LIQUID CRYSTAL DISPLAY PANEL AND LIQUID CRYSTAL DISPLAY DEVICE

This Nonprovisional application claims priority under 35 U.S.C. § 119(a) of Patent Application No. 2004-068805 filed in Japan on Mar. 11, 2004, the entire contents of which are hereby incorporated by reference.

FIELD OF THE INVENTION

The present invention relates to liquid crystal display panels and liquid crystal display devices capable of producing dual images. Viewers looking at a dual image display from different viewing positions see different images.

BACKGROUND OF THE INVENTION

Some recent models of liquid crystal displays and like display panels include a parallax barrier so that the viewer can see (autostereoscopic) 3D images without using a filter system or other visual effect enhancer. The parallax barrier contains stripes of optically transparent regions and opaque regions.

A man's eyes sit spatially apart on the head. So the eyes receive images as seen from two different points in the normal field of vision. The brain then exploits parallax of these two images to perceive it in three dimensions. A three-dimensional (3D) display is produced based on the same principle, i.e., a parallax experienced by the viewer's right/left eyes viewing images produced as seen from different points.

Figure 7:
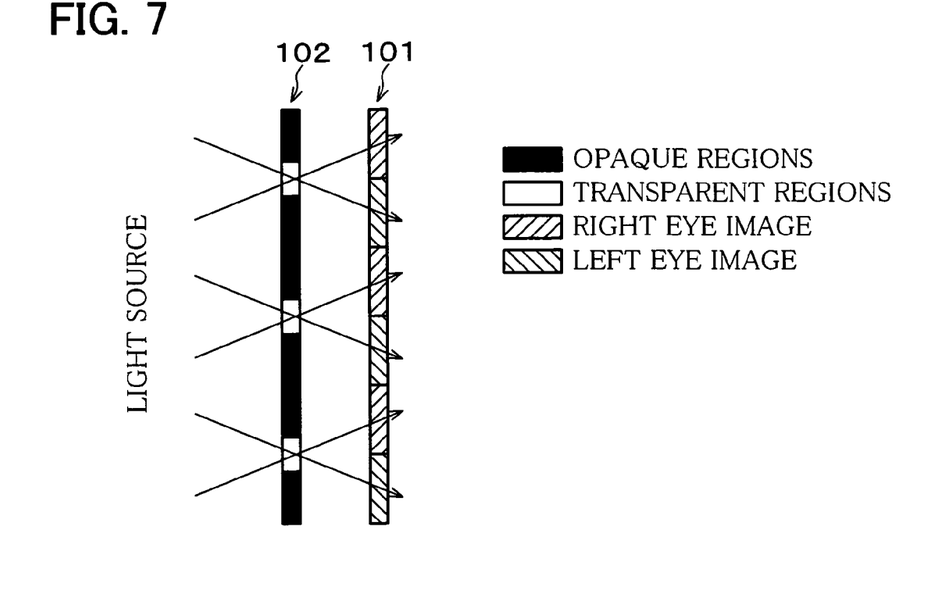
FIG. 7 is a diagram depicting a 3D display principle where a parallax barrier sets a viewing angle.
Figure 8:
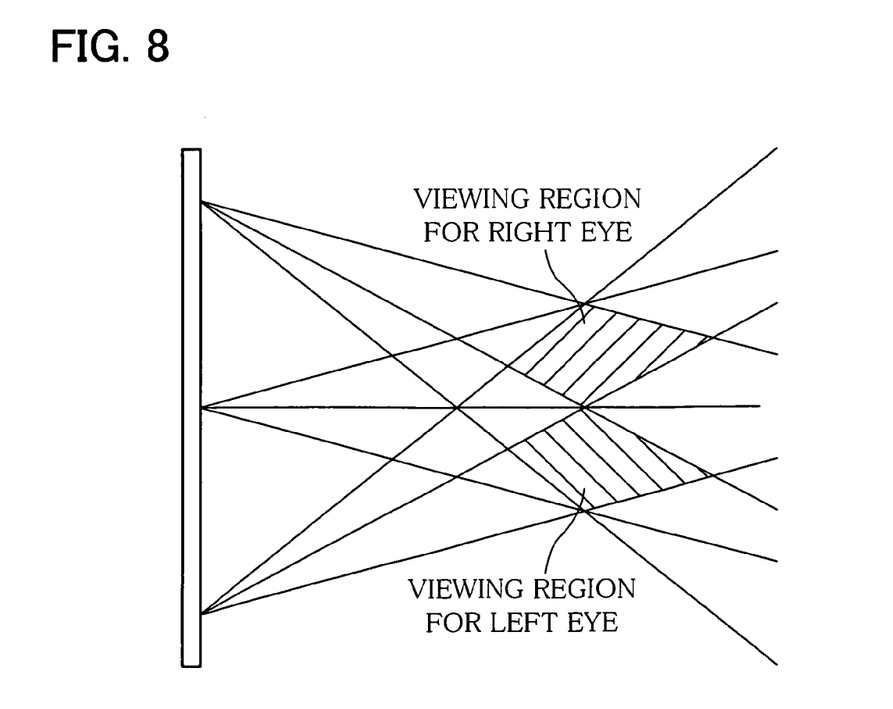
FIG. 8 is a diagram showing viewing regions for a 3D display screen.

In a 3D display device with a parallax barrier, a parallax barrier 102 outside a display panel 101 sets a particular viewing angle (see FIG. 7) for a right eye image and a left eye image produced by the display panel 101. The eyes receive respective images when the viewer positions himself in a particular viewing region in space, so that the viewer can perceive a 3D image (see FIG. 8).

This kind of 3D display device including the combination of a parallax barrier and a display panel is disclosed, for example, in Japanese Laid-open Patent Application No. 3-119889/1991 ("Tokukaihei No. 3-119889," published on May 22, 1991). In the 3D display device of Tokukaihei No. 3-119889, the parallax barrier is included in a switching liquid crystal layer. Turning on/off the barrier pattern in the switching liquid crystal layer enables/disables parallax barrier effect. This enabling/disabling switches the device between 3D mode and 2D mode.

Figure 9A:
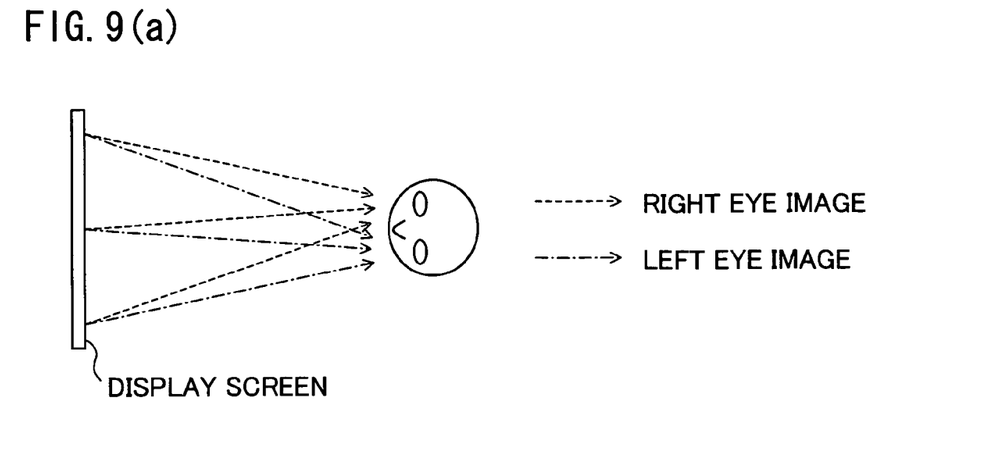

The combination of a parallax barrier and a display panel is applicable in a display device for other purposes than the 3D display (see FIG. 9(a)). The combination could be used, for example, to produce different displays to different viewers ("dual image display;" see FIG. 9(b)).

Theoretically, the dual image display is produced based on the same image separation as 3D displays. However, new problems, which were not found with 3D display devices, occur in the actual manufacture of display devices producing a dual image display. Specific description of the problems will be given next.

Figure 9B:
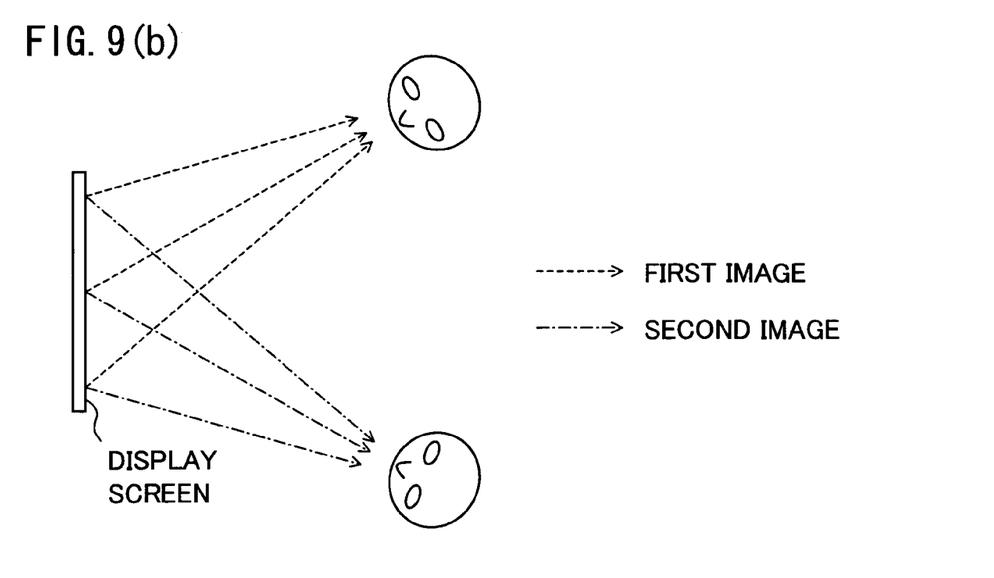

A comparison of FIGS. 9(a), 9(b) would clearly show that the display images are separated by the parallax barrier at the same points for a 3D display and for a dual image display. Some conditions (for example, distance between the viewing points) concerning the viewing points, however, differ greatly between the two display modes.

More specifically, in 3D display mode, the distance between the viewing points is equal to the distance between the viewer's eyes. In contrast, the distance between the viewing points in dual image display mode needs be greater than that in 3D display mode so that viewers can position themselves away from each other. The distance between the viewing points can be set to a given value by varying the distance between the color filter and the parallax barrier.

The distance, D, between the viewer and the display screen is given by:

$$D = ES/nP \quad (1)$$

where E is the distance between the viewing points in millimeters, P is the pixel pitch of the color filter in millimeters, S is the distance between the color filter and the parallax barrier in millimeters, and n is the refractive index of a medium between the color filter and the parallax barrier.

Assume E=62 mm, D=600 mm, and P=0.1 mm for a 3D display. Assume also that the medium between the color filter and the parallax barrier be a glass substrate and a glass's refractive index n=1.52. Inserting these values to equation (1), we obtain a distance S between the color filter and the parallax barrier at S=1.47 mm. This value of distance S is perfectly feasible even with the glass substrate intervening between the color filter and the parallax barrier. The provision of the parallax barrier outside the display panel poses no problems at all in the 3D display device.

Now, assume E=900 mm for a dual image display. All the other conditions are identical to the 3D display. Inserting the values to equation (1), we obtain S=0.1 mm. This value of distance S is extremely difficult to achieve if there is a glass substrate intervening between the color filter and the parallax barrier. In other words, the color filter is required to be closer (about 50 μm to 100 μm) to the parallax barrier in the dual image display device than in the 3D display device. This requirement, unlike in the 3D display device, makes it extremely difficult to provide the parallax barrier outside the display panel in manufacture.

BRIEF SUMMARY

The present invention, conceived to address these problems, provides a liquid crystal display panel and device capable of a dual image display where different images are displayed for viewers at different viewing positions.

The liquid crystal display panel in accordance with an example embodiment, to address the problems, includes between two transparent substrates: an image forming layer including at least a liquid crystal layer; a parallax barrier layer separating a display image formed by the image forming layer into multiple images for each of which a different particular viewing angle is set; and a transparent layer adjusting a distance between the image forming layer and the parallax barrier layer.

According to the arrangement, the image forming layer forming a display image and the parallax barrier layer separating the display image formed by the image forming layer are formed in a single cell. The transparent layer adjusts the distance between the image forming layer and the parallax barrier layer. Unlike the conventional structure where the parallax barrier is placed outside the cell, the separation between the image forming layer and the parallax barrier layer is rendered a short distance suitable for dual image displays. A liquid crystal display panel is thus manufactured which enables a dual image display.

The image forming layer is a means to form a display image in accordance with input image data and refers basically a liquid crystal layer in a liquid crystal display panel. However, if the liquid crystal display panel includes a color filter, the image forming layer refers collectively to the liquid crystal layer and the color filter.

Additional objects, advantages and novel features will be set forth in part in the description which follows, and in part will become apparent to those skilled in the art upon examination of the following or may be learned by practice of the invention.

BRIEF DESCRIPTION OF THE DRAWINGS

FIGS. 9(*a*) and 9(*b*) are diagrams showing the relative positions of the display screen and the viewer for a 3D display and for a dual image display respectively.

DESCRIPTION OF THE EMBODIMENTS

Embodiment 1

Figure 1:
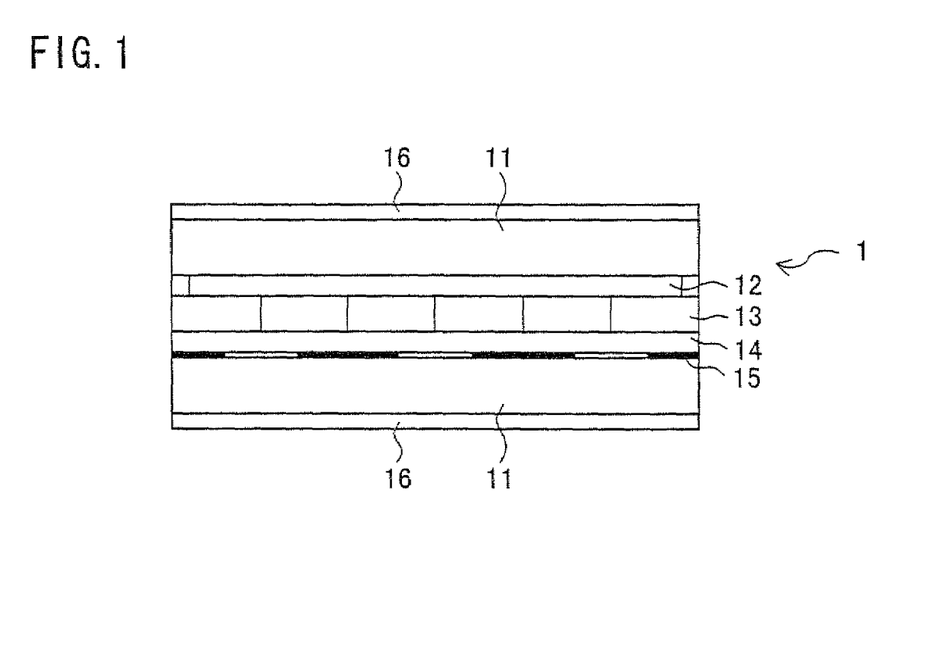
FIG. 1, illustrating an embodiment of the invention, is a cross-sectional view of the structure of the major part of a liquid crystal display panel in association with a first example embodiment.

The following will describe an example embodiment with in reference to FIG. 1. First, the structure of a liquid crystal display panel in association with the present embodiment will be described briefly in reference to FIG. 1.

A liquid crystal display panel 1, as shown in FIG. 1, includes two transparent substrates 11. Each substrate 11 has provided on it a transparent electrode layer and an alignment film (neither shown). Between the substrates 11 the panel 1 further includes a liquid crystal layer 12, a color filter 13, a thick resin layer 14, and a parallax barrier layer 15. A polarizer 16 is provided on an external side of each transparent substrate 11.

Differently put, in the liquid crystal display panel 1, the parallax barrier layer 15 is formed between the two transparent substrates 11, that is, inside the cell. A conventional parallax barrier was placed outside the panel. Moreover, the parallax barrier layer 15 is separated from the color filter 13 by the thick resin layer 14. The parallax barrier layer 15, if placed in contact with the color filter 13, would fail to deliver its parallax barrier functions. The separation between the parallax barrier layer 15 and the color filter 13 is adjusted to a suitable value by means of the thickness of the thick resin layer 14.

The separation between the color filter 13 and the parallax barrier layer 15 is hence specified to a short distance (about 50 μm to 100 μm) suitable for the dual image display, for the purpose of manufacturing the liquid crystal display panel 1.

In the liquid crystal display panel 1, the thick resin layer 14 is given the role of adjusting the separation between the color filter 13 and the parallax barrier layer 15. This is because of the member which has a predetermined pixel pitch, the color filter 13 is positioned closest to the parallax barrier layer 15. If the liquid crystal display panel 1 includes no color filter 13 or the liquid crystal layer 12 is positioned closer to the parallax barrier layer 15 than the color filter 13, it is the thick resin layer 14 that adjusts the distance between the liquid crystal layer 12 and the parallax barrier layer 15. These structures are applicable also to embodiments 2 and 3 which will be detailed later.

In the liquid crystal display panel 1, the parallax barrier layer 15 is positioned behind the liquid crystal layer 12 and the color filter 13 with the intervening thick resin layer 14 separating the layer 15 from the layer 12 and filter 13.

In the liquid crystal display panel 1, one of the two substrates 11, sandwiching the liquid crystal layer 12, which has the thick resin layer 14 and the parallax barrier layer 15 is fabricated as follows.

First, a non-transmissive material (resin, metal, etc) is applied to a surface of the transparent substrate 11 made of, for example, glass, so as to form a film of a predetermined thickness. The film is then patterned to form the parallax barrier layer 15.

On the parallax barrier layer 15, the thick resin layer 14 of a predetermined thickness is formed of an acrylic or other transparent resin. The thickness is determined to separate the parallax barrier layer 15 from the color filter 13 by a suitable distance. The color filter 13 is then formed on the thick resin layer 14. The transparent electrode layer and the alignment film are formed on the filter 13.

In the structure in FIG. 1, the thick resin layer 14 intervenes between the parallax barrier layer 15 and the color filter 13. An alternative to the thick resin layer 14 is a glass plate etched down to a predetermined thickness intervening between the parallax barrier layer 15 and the color filter 13. Using the glass plate, it is still possible to adjust the distance between the parallax barrier layer 15 and the color filter 13 to a suitable value.

Figure 10:
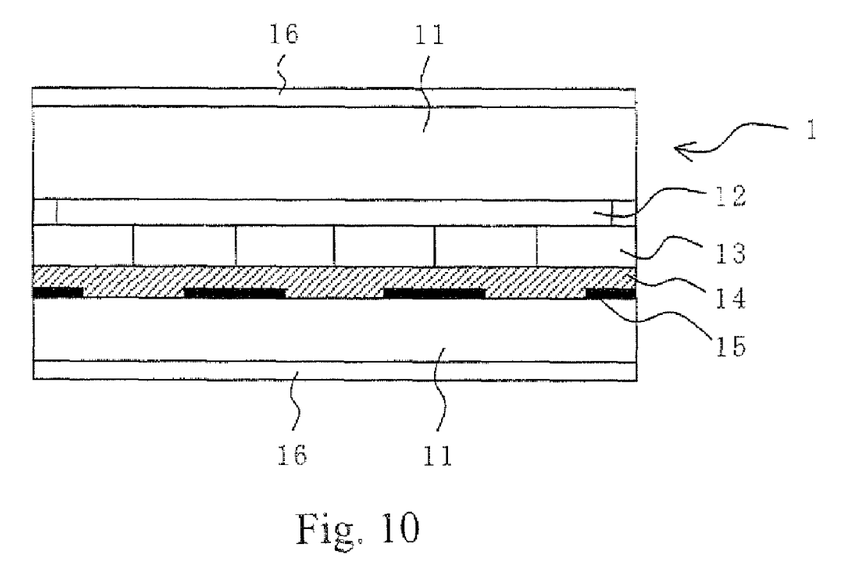
FIG. 10 is a cross-sectional view of a liquid crystal display device in association with another example embodiment.

When this is the case, however, an air layer occurs in the transparent regions of the parallax barrier layer 15 between the glass plate and the transparent substrate 11. The air layer may cause undesirable reflection and refraction and should be filled with a resin having an equal refractive index. This requirement may reduce productivity significantly. In contrast, FIG. 10 shows the structure including the thick resin layer 14 filling the transparent regions of the parallax barrier layer 15, that is, between the non-transmissive regions, with the material forming the thick resin layer 14. The filling leaves no air layer. It is therefore preferable to form the thick resin layer 14 of a material having a substantially equal refractive index to the transparent substrate 11. For example, the transparent substrate 11 may be made of glass, and the thick resin layer 14 of an acrylic resin.

Embodiment 2

Figure 2:
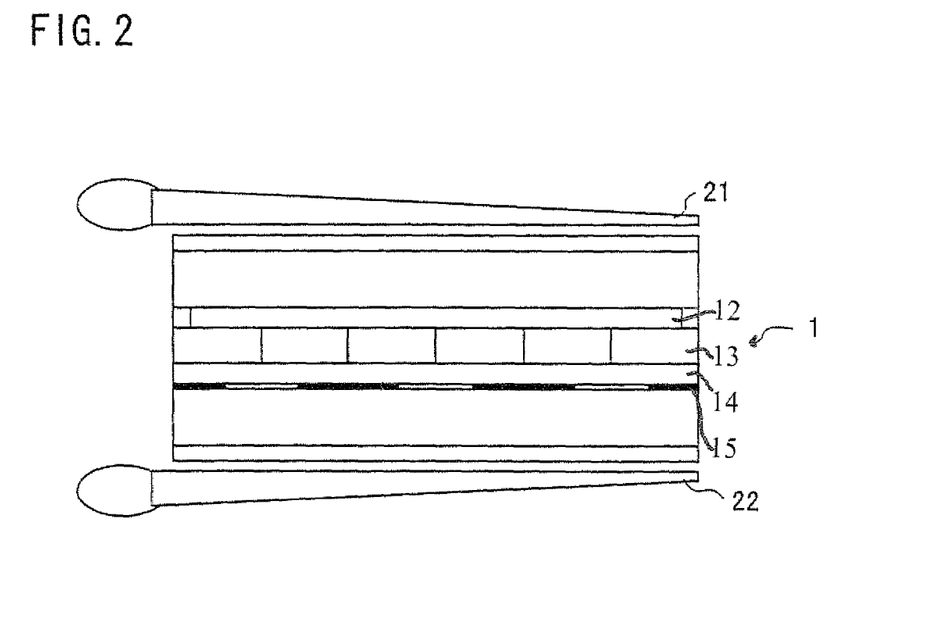
FIG. 2 is a cross-sectional view of the structure of the major part of a liquid crystal display device in association with a second example embodiment.
Figure 3:
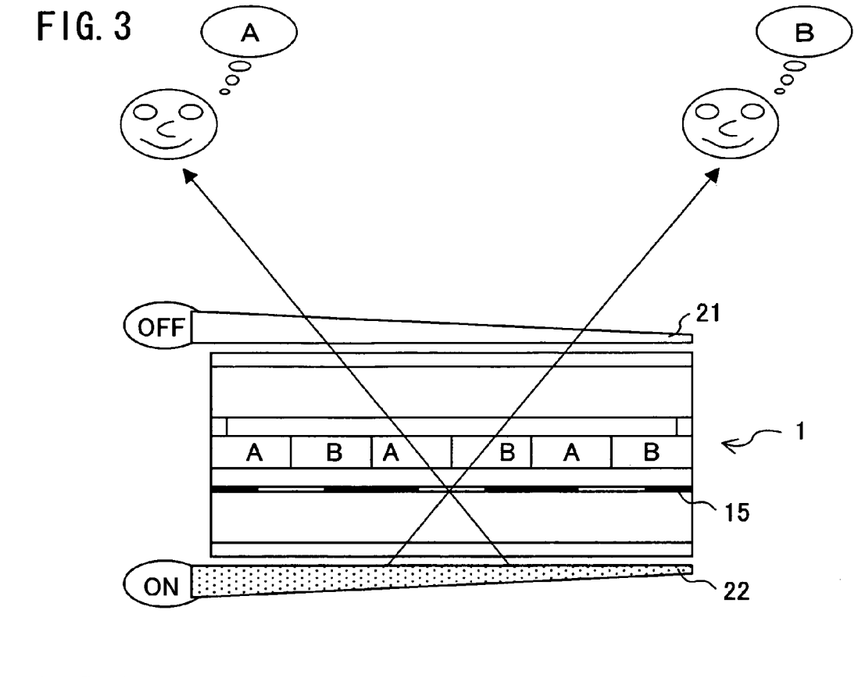
FIG. 3 is a cross-sectional view of a liquid crystal display device in association with the second embodiment producing a dual image display.
Figure 4:
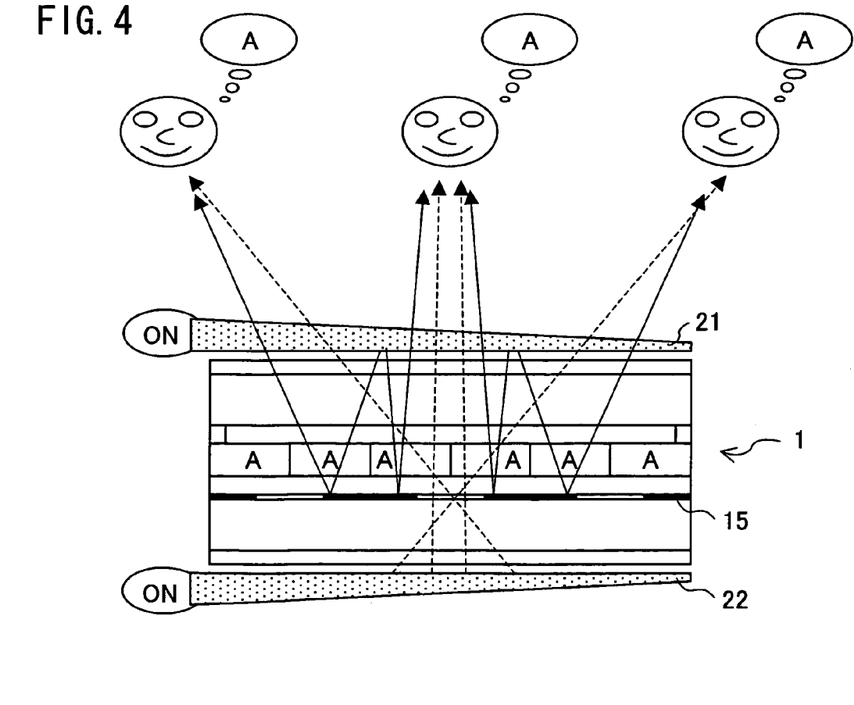
FIG. 4 is a cross-sectional view of a liquid crystal display device in association with the second embodiment producing an ordinary display.

The following will describe another example embodiment with reference to FIG. 2 to FIG. 4.

In the liquid crystal display panel 1 of embodiment 1, the parallax barrier layer 15 was provided inside the cell. This structure of embodiment 1 could not electrically enable/disable the barrier effect, whilst the structure of Tokukaihei No. 3-119889 cited in the "BACKGROUND OF THE INVENTION" can. To put it differently, the liquid crystal display panel 1 was not capable of switching between a dual image display and an ordinary display merely through the structural arrangement of the panel with a similar technique to the 2D/3D display switching of Tokukaihei No. 3-119889. There appears to be great demand, however, to see dual image/ordinary mode switching functionality incorporated into liquid crystal display devices capable of a dual image display.

Present embodiment 2 will describe the structure of a liquid crystal display device with a capability to switch between dual image mode and ordinary mode. This liquid crystal display device is built around the liquid crystal display panel of embodiment 1.

FIG. 2 shows the structure of a liquid crystal display device in association with present embodiment 2. The liquid crystal display device, as shown in FIG. 2, contains the liquid crystal display panel 1 of embodiment 1. The device further comprises a frontlight unit 21 and a backlight unit 22 on the front and back of the device respectively. The "front" here refers to the side facing the viewer. The frontlight and backlight units 21, 22 are well-known lighting units each including a light source and a light guide plate.

In the liquid crystal display panel 1 in the liquid crystal display device in association with present embodiment 2, the parallax barrier layer 15 is a reflective metal layer. To enable switching between dual image and ordinary modes, the parallax barrier layer 15 needs be placed behind the liquid crystal layer 12 and the color filter 13 in the liquid crystal display panel 1. The thick resin layer 14 also needs to be provided separating the layer 15 from the layer 12 and the filter 13.

The following will describe principles in switching the liquid crystal display device between dual image mode and ordinary mode in reference to FIGS. 3, 4.

FIG. 3 illustrates dual image mode in operation. In the dual image mode, only the backlight unit 22 is turned on. The frontlight unit 21 is turned off. Displays are created only by the light emitted and traveling from the backlight unit 22. The light passes through the parallax barrier layer 15, when image A and image B in FIG. 3 are individually set to a predetermined viewing angle, achieving a dual image display.

FIG. 4 illustrates an ordinary mode in operation. In the ordinary mode, the frontlight unit 21 is turned on. Displays are created by the light emitted by the frontlight unit 21 which is reflected off the parallax barrier layer (reflective metal layer) 15. The reflection does not pass through the parallax barrier layer, let alone experience any optical path separation due to the parallax barrier. An ordinary display is thus achieved.

In the ordinary mode, the backlight unit 22 may not be turned on. Turning on both the frontlight unit 21 and the backlight unit 22, however, produces brighter images with the light from the frontlight unit 21 (indicated by solid lines in FIG. 4) and the light from the backlight unit 22 (indicated by broken lines in FIG. 4).

Embodiment 3

Figure 5:
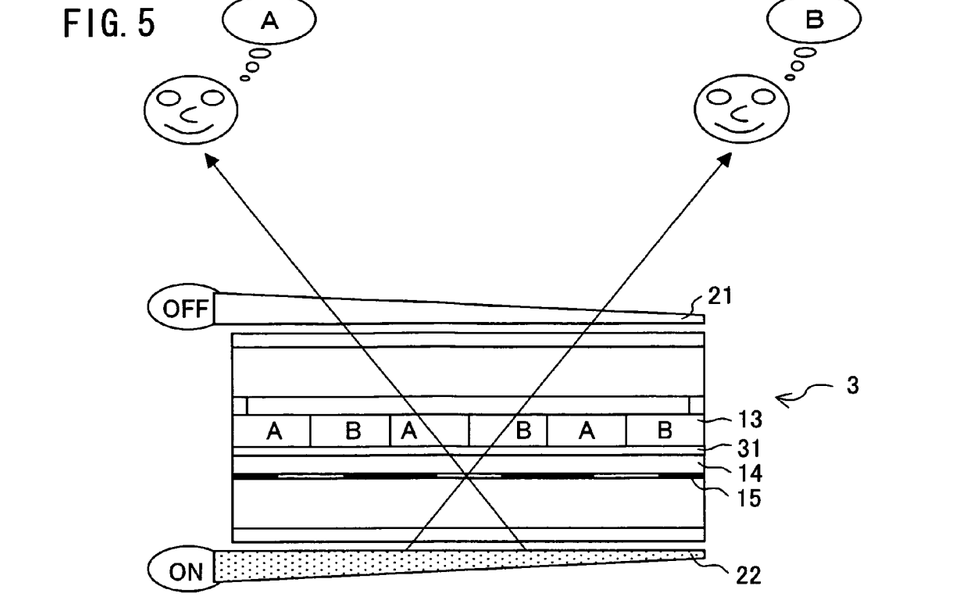
FIG. 5 is a cross-sectional view of a liquid crystal display device in association with a third example embodiment producing a dual image display.
Figure 6:
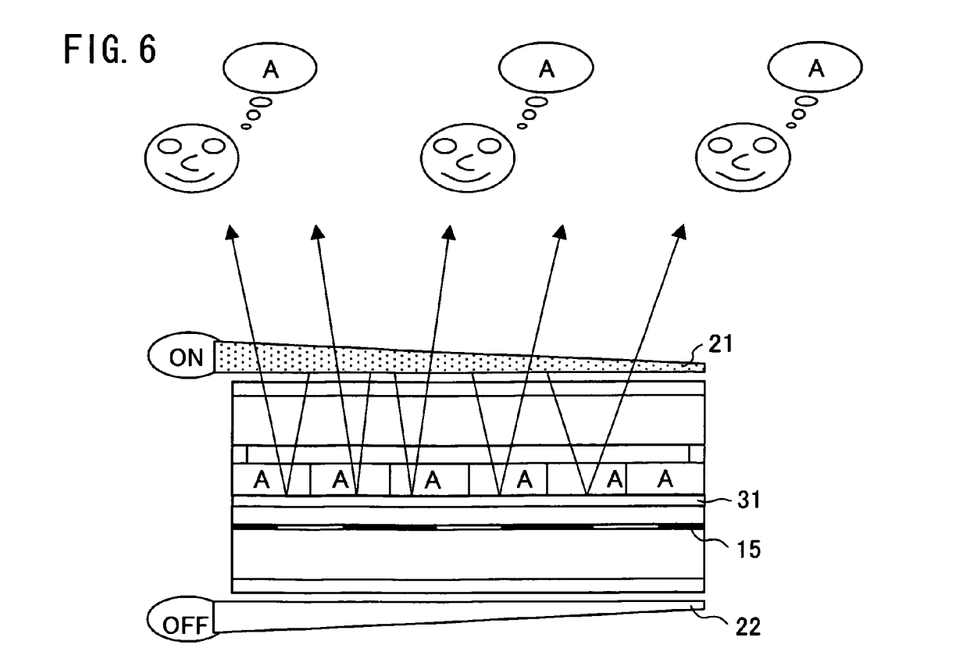
FIG. 6 is a cross-sectional view of a liquid crystal display device in association with the third embodiment producing an ordinary display.

The following will describe another example embodiment with reference to FIGS. 5, 6.

FIG. 5 shows the structure of a liquid crystal display device in association with present embodiment 3. The liquid crystal display device, as shown in FIG. 5, comprises a liquid crystal display panel 3. The device further contains a frontlight unit 21 and a backlight unit 22 on the front and back of the device respectively. The "front" here refers to the side facing the viewer. The frontlight unit 21 and the backlight unit 22 are well-known lighting units each including a light source and a light guide plate.

The liquid crystal display panel 3 is similarly constructed to the liquid crystal display panel 1 of embodiment 1. Members of the liquid crystal display panel 3 which are arranged and operate in a similar manner as those in the liquid crystal display panel 1 are identified by the same reference numerals, so that no detailed description is necessary.

The liquid crystal display panel 3 differs from the liquid crystal display panel 1 in that there is provided a semitransparent reflector plate 31 between the color filter 13 and the parallax barrier layer 15. FIG. 5 shows the semitransparent reflector plate 31 between the color filter 13 and the thick resin layer 14. The plate 31 may be placed between the thick resin layer 14 and the parallax barrier layer 15. The semitransparent reflector plate 31 may be of a type with through holes or based on a half mirror.

Due to the provision of the semitransparent reflector plate 31, the parallax barrier layer 15 may not be a reflective metal layer as in embodiment 2. The layer 15 may be made of a resin. In the liquid crystal display panel 3 in association with present embodiment 3, the parallax barrier layer 15 may be made of any material. The distance between the color filter 13 and the parallax barrier layer 15 is adjusted using the thick resin layer 14, with the thickness of the semitransparent reflector plate 31 being taken into consideration.

FIG. 5 illustrates dual image mode in operation. In the dual image mode, only the backlight unit 22 is turned on. The frontlight unit 21 is turned off. Displays are created only by the light emitted and traveling from the backlight unit 22. The light passes through the parallax barrier layer 15, when image A and image B in FIG. 5 are individually set to a predetermined viewing angle, achieving a dual image display. The light traveling through the semitransparent reflector plate 31 is used to produce displays.

FIG. 6 illustrates ordinary mode in operation. In the ordinary mode, the frontlight unit 21 is turned on. Displays are created by the light emitted by the frontlight unit 21 which is reflected off the semitransparent reflector plate 31. The reflection does not pass through the parallax barrier layer 15, let alone experience any optical path separation due to the parallax barrier. An ordinary display is thus achieved.

In the ordinary mode, the backlight unit 22 may not be turned on as in embodiment 2. Turning on both the frontlight unit 21 and the backlight unit 22, however, produces brighter images.

The parallax barrier layer 15 may be made of any material comprising the liquid crystal display panel 3. Nevertheless, the parallax barrier layer 15, when made of a reflective metal, makes it possible to utilize the light traveling through the semitransparent reflector plate 31 to produce displays at increased brightness in the ordinary mode as in embodiment 2.

A variation of the liquid crystal display device of the present embodiment (shown in FIG. 10) can omit the semitransparent reflector plate 31, but provide instead transparent regions and reflective regions in the pixel electrodes formed in contact with the liquid crystal layer 12. The structure achieves an ordinary display using reflection off the reflective regions of the pixel electrodes when the frontlight unit 21 is turned on. If the structure includes the color filter 13, the color filter 13 needs be placed on the front of the liquid crystal layer 12.

The liquid crystal display panel to address the previously described problems includes between two transparent substrates: an image forming layer including at least a liquid crystal layer; a parallax barrier layer separating a display image formed by the image forming layer into multiple images for each of which a different particular viewing angle is set; and a transparent layer adjusting a distance between the image forming layer and the parallax barrier layer.

According to the arrangement, the image forming layer forming a display image and the parallax barrier layer separating the display image formed by the image forming layer are formed in a single cell. The transparent layer adjusts the distance between the image forming layer and the parallax barrier layer. Unlike the conventional structure where the parallax barrier is placed outside the cell, the separation between the image forming layer and the parallax barrier layer is rendered a short distance suitable for dual image displays. A liquid crystal display panel is thus manufactured which enables a dual image display.

The image forming layer is a means to form a display image in accordance with input image data and refers basically a liquid crystal layer in a liquid crystal display panel. However, if the liquid crystal display panel includes a color filter, the image forming layer refers collectively to the liquid crystal layer and the color filter.

In the liquid crystal display panel, it is preferable if the transparent layer is made of a transparent resin.

According to the arrangement, in those parts of the parallax barrier layer where no non-transmissive layer is formed, that is, transparent regions, the transparent layer is formed in contact with the transparent substrate (there is no air layer, etc.). Since the transparent layer has a substantially equal refractive index to the transparent substrate, no light undesirably refracts or reflects at the interface between the transparent layer and the transparent substrate, which contributes to a good display.

The liquid crystal display device, to address the previously described problems, includes the liquid crystal display panel. Thus, a liquid crystal display device is thus manufactured which enables a dual image display.

The liquid crystal display device may be arranged so that: the parallax barrier layer in the liquid crystal display panel is a reflective metal pattern; and the liquid crystal display device further includes a frontlight unit and a backlight unit on a front and a back of the liquid crystal display panel respectively.

According to the arrangement, when the backlight unit is turned on, a dual image display is achieved by the light emitted by the backlight unit which is transmitted by the parallax barrier layer. When the frontlight unit is turned on, an ordinary display is achieved by the light emitted by the frontlight unit which is reflected off the parallax barrier layer surface provided as a reflective metal layer. This enables a combination of a liquid crystal display panel and two light units to switch between dual image mode and ordinary mode by switchably turning on the light units.

In the liquid crystal display device, the liquid crystal display panel further includes a semitransparent reflective layer between the image forming layer and the parallax barrier layer; and the device further includes a frontlight unit and a backlight unit on a front and a back of the liquid crystal display panel respectively.

According to the arrangement, when the backlight unit is turned on, a dual image display is achieved by the light emitted by the backlight unit and transmitted through the parallax barrier layer and the semitransparent reflective layer. When the frontlight unit is turned on, an ordinary display is achieved by the light emitted by the frontlight unit which is reflected off the semitransparent reflective layer. This enables a combination of a liquid crystal display panel and two light units to switch between dual image mode and ordinary mode by switchably turning on the light units.

In the liquid crystal display device, the liquid crystal display panel further includes a pixel electrode in contact with the liquid crystal layer, the pixel electrode having transparent regions and reflective regions; and the device further includes a frontlight unit and a backlight unit on a front and a back of the liquid crystal display panel respectively.

According to the arrangement, when the backlight unit is turned on, a dual image display is achieved by the light emitted by the backlight unit which is transmitted by the transparent regions of the parallax barrier layer and the pixel electrode. When the frontlight unit is turned on, an ordinary display is achieved by the light emitted by the frontlight unit which is reflected off the reflective regions of the pixel electrode. This enables a combination of a liquid crystal display panel and two light units to switch between dual image mode and ordinary mode by switchably turning on the light units.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display panel, comprising between two transparent substrates:
   an image forming layer including at least a liquid crystal layer a color filter;
   a parallax barrier layer separating a display image formed by the image forming layer into multiple images for each of which a different particular viewing angle is set;
   a transparent resin layer adjusting a distance between the image forming layer and the parallax barrier layer; and
   wherein only the transparent resin layer is formed between the image forming layer and the parallax barrier layer.

2. The liquid crystal display panel as set forth in claim 1, wherein the transparent resin layer has a substantially equal refractive index to the transparent substrate.

3. The liquid crystal display panel as set forth in claim 1, wherein the transparent resin layer sets the distance between the image forming layer and the parallax barrier layer to 50 µm to 100 µm.

4. A liquid crystal display device comprising:
   a liquid crystal display panel included between two transparent substrates:
   an image forming layer including at least a liquid crystal layer a color filter;
   a parallax barrier layer separating a display image formed by the image forming layer into multiple images for each of which a different particular viewing angle is set;
   a transparent resin layer configured to adjust a distance between the image forming layer and the parallax barrier layer;
   wherein only the transparent resin layer is formed between the image forming layer and the parallax barrier layer.

5. A liquid crystal display device comprising:
   a liquid crystal display panel included between two transparent substrates:
   an image forming layer including at least a liquid crystal layer;
   a parallax barrier layer separating a display image formed by the image forming layer into multiple images for each of which a different particular viewing angle is set;
   a transparent resin layer configured to adjust a distance between the image forming layer and the parallax barrier layer; wherein:

the parallax barrier layer comprises a reflective metal pattern; and the liquid crystal display device further comprises a frontlight unit and a backlight unit on a front and a back of the liquid crystal display panel respectively.

6. A liquid crystal display device comprising:

a liquid crystal display panel included between two transparent substrates:

an image forming layer including at least a liquid crystal layer;

a parallax barrier layer separating a display image formed by the image forming layer into multiple images for each of which a different particular viewing angle is set;

a transparent resin layer configured to adjust a distance between the image forming layer and the parallax barrier layer;

wherein the liquid crystal display panel further includes a semitransparent reflective layer between the image forming layer and the parallax layer; and the device further comprises a frontlight unit and a backlight unit on a front and a back of the liquid crystal display panel respectively.

7. A liquid crystal display device comprising:

a liquid crystal display panel included between two transparent substrates:

an image forming layer including at least a liquid crystal layer;

a parallax barrier layer separating a display image formed by the image forming layer into multiple images for each of which a different particular viewing angle is set;

a transparent resin layer configured to adjust a distance between the image forming layer and the parallax barrier layer;

wherein the liquid crystal display panel further includes a pixel electrode in contact with the liquid crystal layer, the pixel electrode comprising transparent regions and reflective regions; and the device further comprises a frontlight unit and a backlight unit on a front and a back of the liquid crystal display panel respectively.

8. A liquid crystal display panel, comprising between two transparent substrates:

an image forming layer including at least a liquid crystal layer;

a parallax barrier layer separating a display image formed by the image forming layer into multiple images for each of which a different particular viewing angle is set; and a transparent resin layer adjusting a distance between the image forming layer and the parallax barrier layer;

wherein:

the parallax barrier layer is formed by patterning a non-transmissive layer; and the transparent resin layer is formed to extend into spaces between the non-transmissive layer in the parallax baffler layer.

9. A method of manufacturing a liquid crystal display panel, said liquid crystal display panel including between two transparent substrates:

an image forming layer including at least a liquid crystal layer and a color filter;

a parallax barrier layer separating a display image formed by the image forming layer into multiple images for each of which a different particular viewing angle is set; and a transparent resin layer adjusting a distance between the image forming layer and the parallax baffler layer, said method comprising the sequential steps of:

forming the parallax barrier layer on one of the transparent substrates;

forming the transparent resin layer on the parallax baffler layer; and forming the color filter on the transparent resin layer.

\* \* \* \* \*

UNITED STATES PATENT AND TRADEMARK OFFICE
CERTIFICATE OF CORRECTION

PATENT NO. : 7,583,327 B2
APPLICATION NO. : 11/075738
DATED : September 1, 2009
INVENTOR(S) : Tomoo Takatani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this

Fourteenth Day of September, 2010

David J. Kappos
*Director of the United States Patent and Trademark Office*